United States Patent

Adams et al.

[11] Patent Number: 5,708,729
[45] Date of Patent: Jan. 13, 1998

[54] METHOD AND SYSTEM FOR THE REDUCTION OF MEMORY CAPACITY REQUIRED FOR DIGITAL REPRESENTATION OF AN IMAGE

[75] Inventors: James E. Adams, Rochester; Kevin E. Spaulding, Spencerport; Kenneth A. Parulski, Rochester, all of N.Y.

[73] Assignee: Eastman Kodak Company, Rochester, N.Y.

[21] Appl. No.: 420,462

[22] Filed: Apr. 12, 1995

[51] Int. Cl.[6] .................. G06K 9/00; G06K 9/36
[52] U.S. Cl. .................. 382/169; 382/232; 382/237; 382/241; 341/55; 341/95; 364/200
[58] Field of Search .................. 382/232, 241, 382/237, 169; 235/463; 364/722, 200; 341/55, 95, 50, 51; 348/254, 671, 674; 250/363.01

[56] References Cited

U.S. PATENT DOCUMENTS

| | | | |
|---|---|---|---|
| 4,199,677 | 4/1980 | Vanderpool | 235/463 |
| 4,263,650 | 4/1981 | Bennett et al. | 364/200 |
| 4,748,577 | 5/1988 | Marchant | 364/722 |
| 4,791,403 | 12/1988 | Mitchell et al. | 341/51 |
| 4,808,826 | 2/1989 | Lim et al. | 250/363.01 |
| 4,973,833 | 11/1990 | Takada et al. | 250/208.1 |
| 5,164,993 | 11/1992 | Capozzi et al. | 382/169 |
| 5,184,124 | 2/1993 | Molpus et al. | 341/50 |

*Primary Examiner*—Leo Boudreau
*Assistant Examiner*—Daniel G. Mariam
*Attorney, Agent, or Firm*—Peyton C. Watkins

[57] ABSTRACT

A method for compressing a first bit digital input representative of first pixel data into a second bit digital output representative of second pixel data, the method comprises the steps of defining a logarithmic function for converting the first bit digital input into the second bit digital output; replacing a portion of the logarithmic function with a polynomial function; and compressing the first bit digital input into the second bit digital output by utilizing the logarithmic and polynomial function.

8 Claims, 2 Drawing Sheets

METHOD AND SYSTEM FOR THE REDUCTION OF MEMORY CAPACITY REQUIRED FOR DIGITAL REPRESENTATION OF AN IMAGE

FIELD OF THE INVENTION

The invention relates generally to the field of electronic imaging and, more particularly, to electronic imaging having reduced memory capacity requirements for a digital representation of an image by utilizing a combination of a polynomial and logarithmic transformation.

BACKGROUND OF THE INVENTION

The storage of high resolution digital images within an electronic still camera system typically requires substantial memory. For a single sensor camera, a typical image with a resolution of 768 pixels per line×512 lines×10 bits per pixel would require 3,932,160 bits or, equivalently, 491,520 bytes of semiconductor memory storage space. If, for system requirements, each 10 bit pixel value must be stored in a 16 bit word of memory (wasting 6 bits per word), the required amount of memory to store the entire image increases to 786,432 bytes. If the data could be transformed in some reversible manner to require only 8 bits (1 byte) per pixel, without significantly degrading image quality, then only 393,216 bytes of memory are required for a 25% savings of storage memory.

Logarithm transforms have been used in the past to transform ten bit pixel values into eight bit pixel values. Typically one would use an expression such as Equation 1 to map 10 bit linear exposure data into 8 bit logarithmic exposure data.

$$y = \text{round}\left[\frac{25.5}{\log_{10}(2)} \log_{10}(x+1)\right], 0 \leq x \leq 1023 \quad (1)$$

In Equation 1, "x" is the 10 bit linear exposure value, "y" is the corresponding 8 bit logarithmic value and "round()" rounds the result to the nearest integer. Equation 1 can be inverted to produce Equation 2 for transforming a 8 bit logarithmic value to a ten bit linear exposure value.

$$x = \text{round}\left[\text{antilog}_{10}\left(\frac{\log_{10}(2)}{25.5} y\right) - 1\right], 0 \leq y \leq 255 \quad (2)$$

Although the presently known and utilized method for data transformation is satisfactory, it is not without drawbacks. One drawback of the above described logarithmic transforms is that the transform process is inefficient. For example, some of the 256 possible 8 bit logarithmic code values which can be produced to represent 10 bit linear code values by Equation 1 are not used. This is best illustrated by the following examples.

Consider the example where x=9 and x=10. The corresponding values for y using Equation 1 are y=85 and y=88. It is instructive to note that it is not possible to produce a value of y=86 or y=87 for an integer value x with Equation 1. Therefore, these values of y are not used in a system that implements Equation 1, and as previously stated, the result is that not all of the possible 8 bit code values are used.

The previous numerical example also illustrates another drawback. Recalling that x=9 produces y=85, produces a result in which eighty five 8 bit code values are used to represent the range of x=0 to x=9. Obviously, only 9 of these 8 bit values for y are used, resulting in the 74 missing 8 bit values. The reverse problem occurs for large values of x. Consider the example of x=969 and x=996. The corresponding values for Equation 1 are y=253 and y=254. Thus one 8 bit code value corresponds to a range of 27 10 bit code values.

Consequently, a need exists for a method and apparatus for the compression of imaging data in which the method and apparatus prevents the occurrence of missing 8 bit code values and minimizes the number of 10 bit code values represented by any given 8 bit code value.

SUMMARY OF THE INVENTION

The present invention is directed to overcoming one or more of the problems set forth above. Briefly summarized, according to one aspect of the present invention, a method for compressing a first bit digital input representative of an image into a second bit digital output representative of the image, the method comprises the steps of: (a) defining a logarithmic function for converting the first bit digital input into the second bit digital output; (b) replacing a portion of the logarithmic function with a polynomial function and (c) compressing the first bit digital input into the second bit digital output by utilizing the logarithmic and polynomial function which reduces the storage capacity necessary for storing the image.

It is an object of the present invention to provide a combination logarithm/linear polynomial function of the form of equation (3) and a preferred embodiment of equation (3), equation (4):

$$y = \begin{cases} x, & 0 \leq x \leq k_1 \\ \text{round}[a + b\log_{10}(x)], & k_1 < x \leq k_2 \\ \text{round}\left(\sum_{i=0}^{n} c_i x^i\right), & k_2 < x \leq x_0 \end{cases} \quad (3)$$

$$y = \begin{cases} x, & 0 \leq x \leq 68 \\ \text{round}\left[68 + 159\log_{10}\left(\frac{x}{68}\right)\right], & 68 < x \leq 1023 \end{cases} \quad (4)$$

It is an object of the present invention to provide a method and apparatus for the compression of digital imaging data so that memory capacity is minimized during storage of the data.

It is a feature of the present invention to provide means for replacing a portion of a logarithmic function with a slope greater than approximately one with a polynomial function.

It is an advantage of the present invention that the compression of data representing an image does not reduce the quality of the image.

The above and other objects of the present invention will become more apparent when taken in conjunction with the following description and drawings wherein identical reference numerals have been used, where possible, to designate identical elements that are common to the figures.

Advantageous Effect of the Invention

The present invention has the following advantages of having no missing code values in the 10 bit to 8 bit transform and of greatly reducing the number of 10 bit code values represented by a given 8 bit code value throughout the range of 10 bit code values.

DETAILED DESCRIPTION OF THE INVENTION

Figure 1:
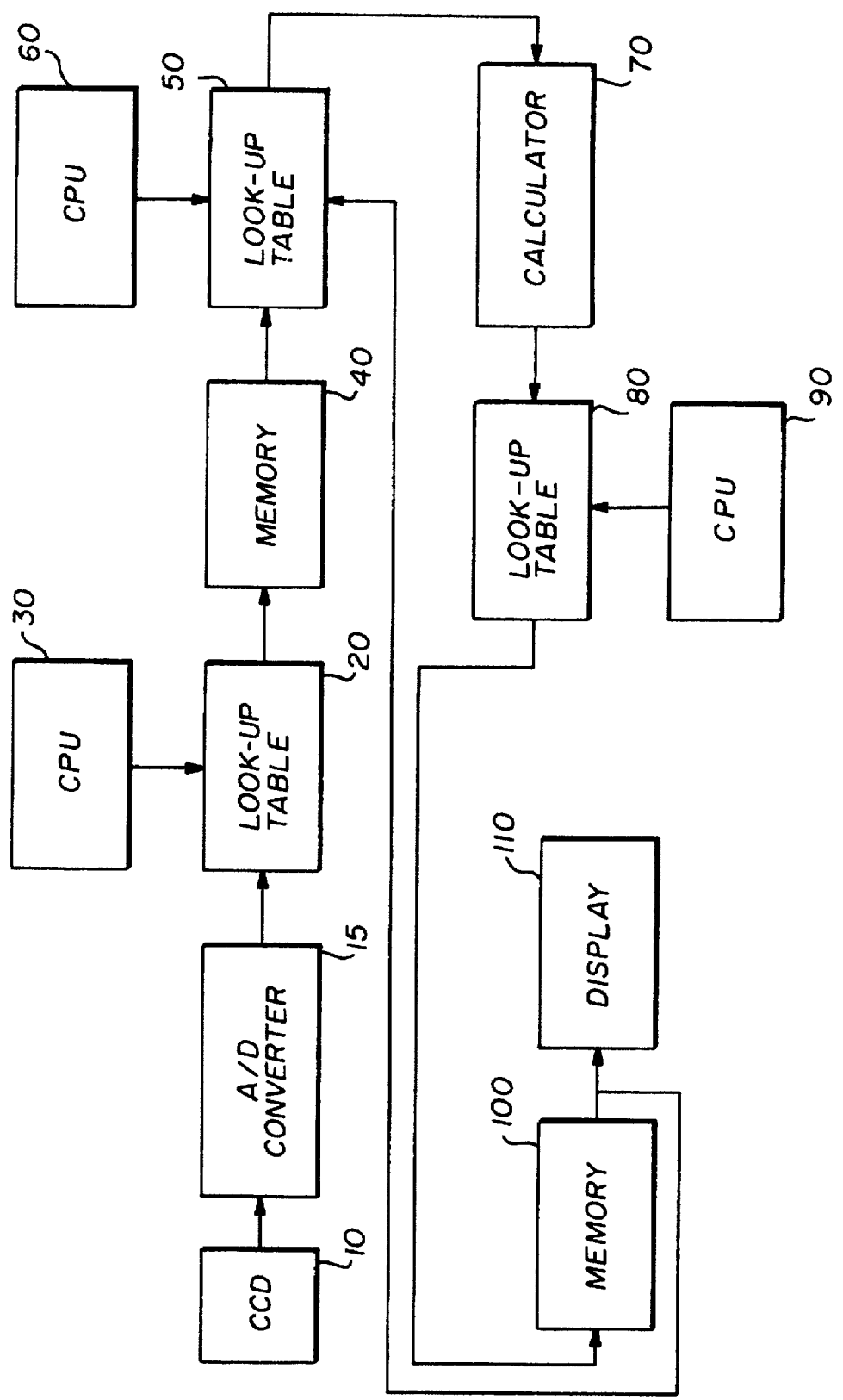
FIG. 1 is a schematic diagram illustrating one embodiment of the present invention.

Referring to FIG. 1, there is illustrated a charge-coupled device (CCD) 10 for receiving and capturing an incident image in electronic form and then converting the image via an analog to digital converter (A/D converter) 15 into ten bit digital form. The digital representation of the image is electronically sent to a look up table 20 for conversion of the ten bit digital image into an eight bit digital image. The look-up table 20 is electrically connected to and created by a central processing unit (CPU) 30 which utilizes a data compression method of the present invention and is described in detail below. The CPU 30 preferably inputs the data to the look-up table 20 off-line or, in other words, when the look-up table 20 is originally created so that during operation the look-up table 20 simply cross-references the ten and eight bit data.

Once the data is converted to eight bit data, it is stored in memory 40 for later use. It is instructive to point out, although obvious to those skilled in the art, that data stored in eight bit form utilizes less memory than ten bit data. When this data is needed for other purposes, for example editing and other similar purposes, the eight bit data is converted back to ten bit by a look-up table 50 which is created similar to the other look-up table 50 (via a CPU 60); however, it obviously cross references in the opposite direction. The data is then manipulated by a calculator 70 for editing the data representing the image and then passed to a third look-up table 80 which is also created similar to the first look-up table 30 (via a CPU 90) for conversion back to eight bit data. The data is then again stored in memory 100 where it may be accessed by the second look-up table 50 and again edited as described above, or the image may be output to any suitable output device 110, such as a printer or display.

It may be obvious to those skilled in the art that CPU 30 and look-up table 20 could be the same device as CPU 90 and look-up table 80 for performing both operations. This would eliminate the need for redundant hardware.

Figure 2:
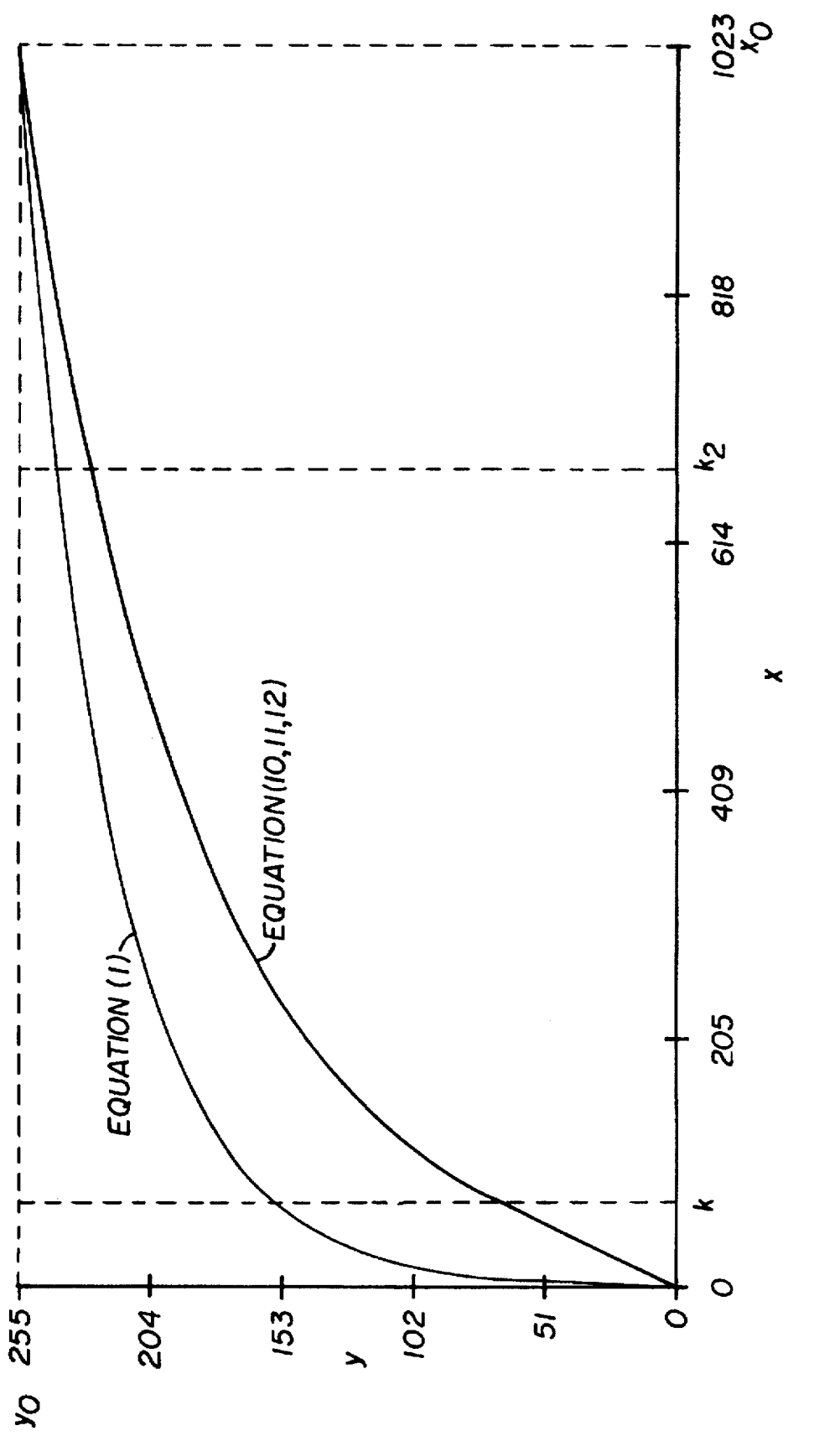
FIG. 2 is a graph illustrating ten bit code values versus eight bit code values.

The CPUs 30, 60 and 90 create the look-up tables 20, 50, and 80 as follows. Referring now to FIG. 2, first, the ten bit linear code value is transformed to an eight bit logarithmic code value by methods which are well known in the art, such as equation (1) which is illustrated by the thin line. To eliminate the occurrence of missing 8 bit code values in the 10 bit to 8 bit transform, the portion of the logarithmic curve that has a slope in excess of unity must be modified or replaced to prevent the slope from exceeding unity. This is most easily achieved by switching to an appropriate linear function at a point (k) that the logarithmic slope exceeds unity. Although unity is the preferred value, any value that is generally close in value to unity may be used. The resulting form of this transform is presented in Equation 5.

$$y = \begin{cases} x, & 0 \leq x \leq k \\ \text{round}[a + b\log_u(x)], & k < x \leq x_0 \end{cases} \quad (5)$$

For clarity, the logarithm base, u, will be defined later. The value $x_o$ is the maximum value x can attain and is a known constant. This leaves three constants, a, b and k, that need to be determined. Three constraints, which are described in detail below, are chosen so that a, b and k may be uniquely determined and, more importantly, cause the transform to possess a number of desirable properties.

The constraints chosen are presented in Equations 6a through 6c. In Equation 6c, $dy^-/dx$ refers to the first derivative of $y^-$ with respect to x. In the sane equation, $dy^+/dx$ is defined similarly.

$$y^-(x=k)=y^+(x=k) \quad (6a)$$

$$y^+(x=x_o)=y_o \quad (6b)$$

$$\frac{dy^-(x=k)}{dx} = \frac{dy^+(x=k)}{dx} \quad (6c)$$

Equations 7 and 8 define $y^-$ and $y^+$, accordingly.

$$y^-(x)=x \quad (7)$$

$$y^+(x)=a+b\log_u(x) \quad (8)$$

Combining Equations 6 through 8 produces expressions that can be used for determining a, b and k for a given set of values for u, $x_o$ and $y_o$. Equation 6a insures that there is no discontinuity at the transition from logarithmic function to linear function. Equation 6b scales the logarithmic function to map the full scale value from the input space, $x_o$, into the full scale value of the output space, $y_o$. Equation 6c guarantees that the slope of the logarithmic function never exceeds the slope of the linear function. The slope of the linear function is unity by design.

For the preferred embodiment of Equation 5, the values of u, $x_o$ and $y_o$ are supplied in Equation 9.

$$\begin{cases} u = 10 \\ x_0 = 2^{10} - 1 \\ y_0 = 2^8 - 1 \end{cases} \quad (9)$$

It is noted at this point that the choice of u is completely arbitrary. While the specific values for a and b will change with u, the resulting transform relation between x and y will be unaltered. The resulting expression in the form of Equation 5 is given in Equation 10.

$$y = \begin{cases} x, & 0 \leq x \leq 68.9812 \\ \text{round}[-223.074 + 158.835\log_{10}(x)], & 68.9812 < x \leq 1023 \end{cases} \quad (10)$$

Recognizing that x only assumes integral values and rearranging the logarithmic expression for mathematical convenience produces Equation 11.

$$y = \begin{cases} x, & 0 \leq x \leq 68 \\ \text{round}\left[67.9930 + 158.835\log_{10}\left(\frac{x}{68}\right)\right], & 68 < x \leq 1023 \end{cases} \quad (11)$$

Due to the round() function the remaining nonintegral coefficients in Equation 11 can be rounded to the nearest integral without significant loss of accuracy to produce Equation 12.

$$y = \begin{cases} x, & 0 \leq x \leq 68 \\ \text{round}\left[68 + 159\log_{10}\left(\frac{x}{68}\right)\right], & 68 < x \leq 1023 \end{cases} \quad (12)$$

Note that Equation 10 (and its derivatives Equations 11 and 12) is only one possible solution for the given constraints of Equations 5 through 9 due to the presence of the round() function. Also, as demonstrated with Equations 11 and 12, there are a variety of ways of expressing the results of an Equation 10-type solution.

It should be noted that all solutions of the form of Equation 10 (and its derivatives) can be inverted to create the reverse transform. The inverse of Equation 12, for instance, is given in Equation 13.

$$x = \begin{cases} y, & 0 \leq y \leq 68 \\ \text{round}\left[68\text{antilog}_{10}\left(\frac{y-68}{159}\right)\right], & 68 < y \leq 255 \end{cases} \quad (13)$$

Comparison of Equation 12 with Equation 1 demonstrates the reduction of the number of 10 bit code values represented by 8 bit code values. FIG. 2 is a plot of both transforms where the heavy line illustrates equation (10) and the thin line illustrates equation (1).

For every value of x above the transition point (k), where x=68, the slope of Equation 12 is steeper than the slope of Equation 1. This can be mathematically proven to be strictly true. Since the slope of Equation 12 is steeper, the number of 10 bit values represented by a 8 bit value must be smaller than for Equation 1. For values of x below the transition point(k), there is, by design, an exact one-to-one correspondence between 10 bit values and 8 bit values. This eliminates the problems that occur when the slope of Equation 1 becomes greater than unity.

For some applications it may be desirable to control the number of 10 bit values mapped into a single 8 bit value for large 10 bit values. In this case, we return to Equation 3 (repeated as Equation 14a) and append a linear polynomial to the upper end of the logarithmic segment. Two example embodiments are demonstrated below.

Assume there is a constraint that limits the allowable number of 10 bit values represented by a single 8 bit value to 10. A version of Equation 14a that is appropriate is given in Equation 14b.

$$y = \begin{cases} x, & 0 \leq x \leq k_1 \\ \text{round}[a + b\log_w(x)], & k_1 < x \leq k_2 \\ \text{round}\left(\sum_{i=0}^{n} c_i x^i\right), & k_2 < x \leq x_0 \end{cases} \quad (14a)$$

$$y = \begin{cases} x, & 0 \leq x \leq k_1 \\ a + b\ln(x), & k_1 < x \leq k_2 \\ cx + d, & k_2 < x \leq x_3 \end{cases} \quad (14b)$$

In Equation 14b, "ln(x)" is the natural logarithm of "x". For convenience, Equation 14b can also be expressed as Equation 15.

$$y = \begin{cases} y_1(x), & 0 \leq x \leq k_1 \\ y_2(x), & k_1 < x \leq k_2 \\ y_3(x), & k_2 < x \leq x_3 \end{cases} \quad (15)$$

The following constants can be defined.

$$\begin{cases} x_3 = 2^{10} - 1 \\ y_3 = 2^8 - 1 \\ y_2' = \frac{1}{10} \end{cases} \quad (16)$$

The value for $y_2'$ is the reciprocal of the maximum number of 10 bit values that may be represented by a single 8 bit value. Finally, Equations 17 through 22 provide the constraints needed to determine the values of a, b, c, d, $k_1$ and $k_2$. In Equations 20 through 22, $y_1'$ refers to the first derivative of $y_1$ with respect to x, i.e., dy/dx. In the same equations, $y_2'$ and $y_3'$ are defined similarly.

$$y = \begin{cases} x, & 0 \leq x \leq k_1 \\ \text{round}[a + b\log_w(x)], & k_1 < x \leq k_2 \\ \text{round}\left(\sum_{i=0}^{n} c_i x^i\right), & k_2 < x \leq x_0 \end{cases} \quad (3)$$

$$y_1(k_1) = y_2(k_1) \quad (17)$$

$$y_2(k_2) = y_3(k_2) \quad (18)$$

$$y_3(x_3) = y_3 \quad (19)$$

$$y_1'(k_1) = y_2'(k_1) \quad (20)$$

$$y_2'(k_2) = y_2' \quad (21)$$

$$y_3'(k_2) = y_2' \quad (22)$$

The combination of Equations 14 through 22 produce Equation 23.

$$y = \begin{cases} x, & 0 \leq x \leq 66 \\ \text{round}[-211.845 + 66.31681\ln(x)], & 66 < x \leq 663 \\ \text{round}(0.1x + 152.7), & 663 < x \leq 1023 \end{cases} \quad (23)$$

The number of 10 bit values represented by a single 8 bit value using Equation 23 never exceeds 10. All the desirable properties of Equation 12 are also present in Equation 23.

Instead of a fixed limit on the number of 10 bit values represented by a single 8 bit value, an upper and lower bound over a given region of 10 bit values can be provided. For example, consider the version of Equation 14a given in Equation 24.

$$y = \begin{cases} x, & 0 \leq x \leq k_1 \\ a + b\ln(x), & k_1 < x \leq k_2 \\ cx^2 + dx + e, & k_2 < x \leq x_3 \end{cases} \quad (24)$$

In addition to Equations 15 through 22, Equations 25 and 26 are also specified.

$$y_3' = \frac{1}{12} \quad (25)$$

$$y_3'(x_3) = y_3' \quad (26)$$

The upper portion of Equation 24, i.e., $y_3(x)$, is now permitted to slowly increase the number of 10 bit values represented by a single 8 bit value from 10 to 12 for 10 bit values between $k_2$ and $x_3$. The resulting transform is given in Equation 27.

$$y = \begin{cases} x, & 0 \leq x \leq 67 \\ \text{round}[-217.128 + 67.57361\ln(x)], & 67 < x \leq 675 \\ \text{round}(-2.39971 \times 10^{-5}x^2 + \\ 0.132431x + 144.636), & 675 < x \leq 1023 \end{cases} \quad (27)$$

The process used to create Equations 23 and 27 can be used to produce any number of embodiments of Equation 14a.

The invention has been described with reference to a preferred embodiment. However, it will be appreciated that variations and modifications can be effected by a person of ordinary skill in the art without departing from the scope of the invention.

For example, the input (x) could have other than 10 bits, for example 12 or 16 bits, and/or the output (y) could have other than 8 bits, for example 6 bits or 10 bits, as long as the output has fewer bits than the input.

Parts List:
10 charge-coupled device
15 analog to digital converter
20 look-up table
30 CPU
40 memory
50 look-up table
60 CPU
70 calculator
80 look-up table
90 CPU
100 memory
110 display

We claim:

1. A method for compressing a first predetermined bit digital input representative of an image into a second predetermined bit digital output representative of the image, the method comprising the steps of:
   (a) defining a logarithmic function for converting the first predetermined bit digital input into the second predetermined bit digital output;
   (b) replacing a portion of the logarithmic function with a polynomial function for forming a resulting function which is continuous in value and slope; and
   (c) compressing the first predetermined bit digital input into the second predetermined bit digital output, via a processor, by utilizing the logarithmic and polynomial function which compressing reduces the required storage capacity for storing the image, wherein the logarithmic and polynomial functions are substantially equal to:

$$y = \begin{cases} x, & 0 \leq x \leq 68.9812 \\ \text{round}[-223.074 + 158.835\log_{10}(x)], & 68.9812 < x \leq 1023. \end{cases}$$

2. The method as in claim 1, wherein step (b) includes:
   (b1) calculating which portion of the logarithmic function includes a slope with a predetermined quantity; and
   (b2) replacing the portion of the logarithmic function with a slope substantially at the predetermined quantity with the polynomial function which is continuous with the remaining portion of the logarithmic function.

3. The method as in claim 2, wherein step (b1) includes calculating which portion of the logarithmic function includes a slope of a value of substantially one.

4. The method as in claim 2, wherein step (b) includes calculating a polynomial which contains no discontinuity between it and the logarithmic function.

5. The method as in claim 1 further comprising the step of: limiting the number of first bit digital input compressed into the second bit digital output substantially equal to:

$$y = \begin{cases} x, & 0 \leq x \leq 66 \\ \text{round}[-211.845 + 66.31681n(x)], & 66 < x \leq 663 \\ \text{round}(0.1x + 152.7), & 663 < x \leq 1023. \end{cases}$$

6. The method as in claim 1 further comprising the step of converting the second predetermined bit digital output into the first bit digital input substantially equal to:

$$x = \begin{cases} y, & 0 \leq y \leq 68 \\ \text{round}\left[68\,\text{antilog}_{10}\left(\frac{y-68}{159}\right)\right], & 68 < y \leq 255. \end{cases}$$

7. The method as in claim 1, wherein the logarithmic and polynomial functions are alternatively substantially equal to:

$$y = \begin{cases} x, & 0 \leq x \leq 68 \\ \text{round}\left[67.9930 + 158.835\log_{10}\left(\frac{x}{68}\right)\right], & 68 < x \leq 1023. \end{cases}$$

8. The method as in claim 1, wherein the logarithmic and polynomial functions are alternatively substantially equal to:

$$y = \begin{cases} x, & 0 \leq x \leq 68 \\ \text{round}\left[68 + 159\log_{10}\left(\frac{x}{68}\right)\right], & 68 < x \leq 1023. \end{cases}$$

* * * * *